United States Patent [19]

Lambert

[11] Patent Number: 5,162,720
[45] Date of Patent: Nov. 10, 1992

[54] VEHICLE ELECTRICAL SYSTEM

[76] Inventor: Gordon K. Lambert, 220 Edgewood Terrace Dr., Apt. U-21, Jackson, Miss. 39206

[21] Appl. No.: 775,497

[22] Filed: Oct. 15, 1991

[51] Int. Cl.⁵ .............................. H02J 7/00; H02J 7/14
[52] U.S. Cl. ...................................... 320/6; 307/150; 320/15; 320/56
[58] Field of Search .................... 320/2, 6, 15, 56; 307/149, 150

[56] References Cited

U.S. PATENT DOCUMENTS

| | | | |
|---|---|---|---|
| 2,866,907 | 12/1958 | Gebhard | 290/36 |
| 3,763,415 | 10/1973 | Ownby | 320/6 |
| 3,949,289 | 4/1976 | Day | 320/6 |
| 4,010,410 | 3/1977 | Kilbourn | 307/150 X |
| 4,044,293 | 8/1977 | Follmer | 320/15 |
| 4,264,855 | 4/1981 | Ghibaudo et al. | 320/6 |
| 4,564,799 | 1/1986 | Iwaki et al. | 320/6 |

Primary Examiner—R. J. Hickey
Attorney, Agent, or Firm—Walker, McKenzie & Walker

[57] ABSTRACT

An improved electrical system for a recreational vehicle or the like including a first battery for starting the engine and the like, having a second or auxiliary battery for providing electric current to interior lights and the like. The improvement includes a link circuit for electrically linking the first and second batteries and a supplemental electric current source such as an independently powered generator or an electric utility current source, and control structure for allowing electric current to flow through the link circuit from the second battery and/or the supplemental electric current source to the first battery and the first battery load without allowing the flow of significant electric current from the first battery to the second battery or the second battery load.

33 Claims, 2 Drawing Sheets

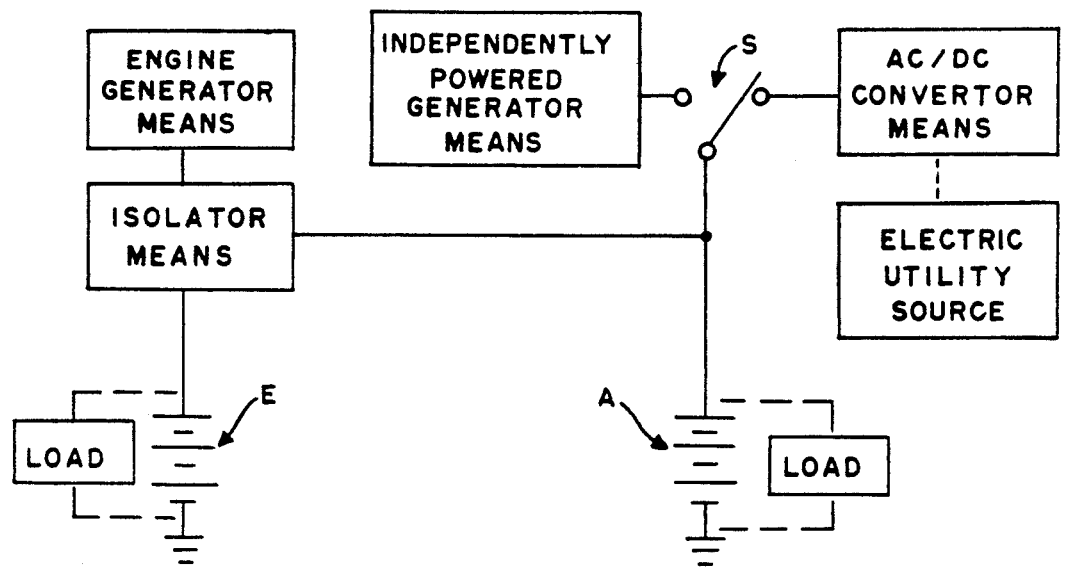
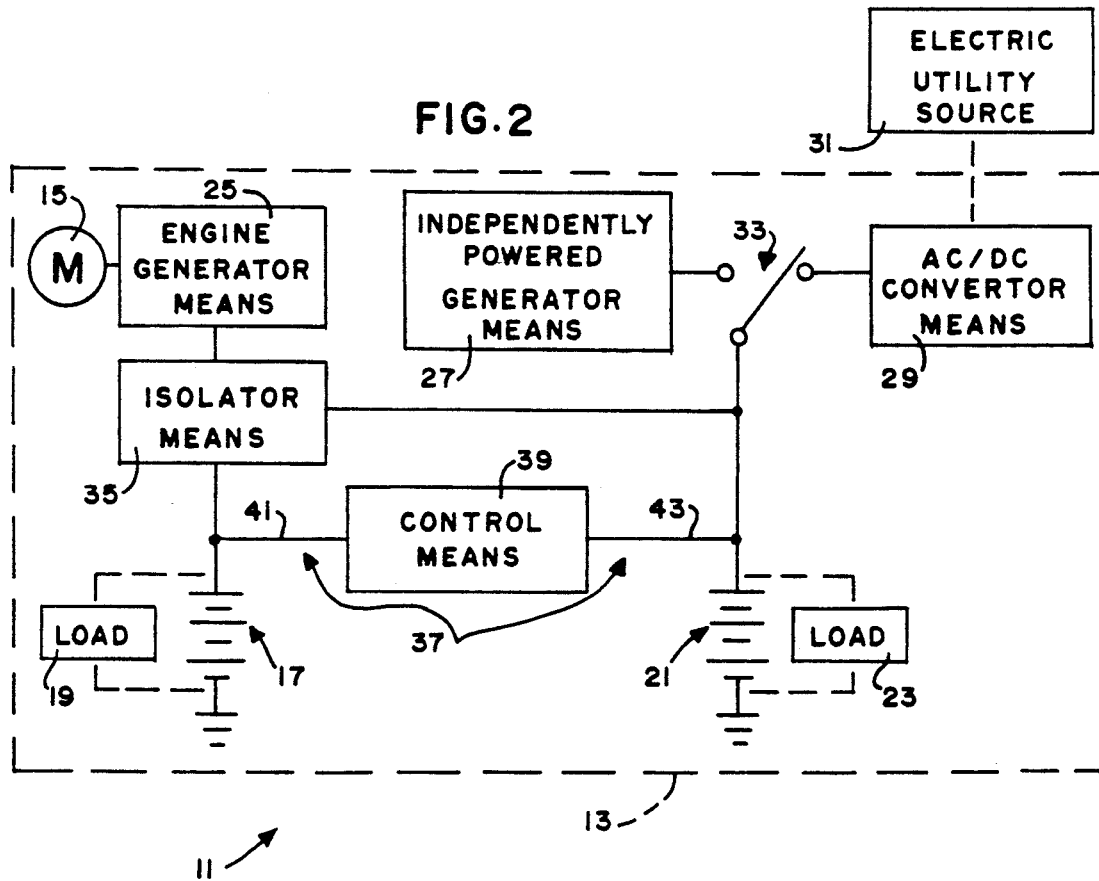

VEHICLE ELECTRICAL SYSTEM

BACKGROUND OF THE INVENTION

1. Field of the Invention

The present invention relates, in general, to electrical systems for vehicles of the type having a first storage battery associated with the engine, horn, running lights or the like, and a second storage battery associated with auxiliaries such as interior lighting.

2. Description of the Related Art

Motor homes, power yachts and similar vehicles commonly use two storage batteries: a first battery (the engine battery) associated with the engine, horn, running lights or the like, and a second battery (the auxiliary battery) associated with auxiliaries such as interior lighting. While the engine is running, its associated generator means maintains the charge in both batteries. When the engine is stopped, the auxiliary battery exclusively powers the interior lighting, etc., to avoid depleting the engine battery since the engine battery is essential to starting the vehicle's engine. Vehicles at rest for extended periods of time are commonly powered by a separate on-board independently powered generator means or by connection to utility electric power. When so powered, the charge in the auxiliary battery is maintained and its load is powered. However, the engine battery and its load have not heretofore been so powered and, over time, the engine battery can become too depleted to start the vehicle. It is common practice to provide an "emergency start switch" in the electrical systems of such vehicles to momentarily connect both the engine battery and the auxiliary battery to the engine starter in the event that the engine batter is too depleted to start the engine. This does not, however, remove the prime dependence placed on the engine battery for engine starting.

To help avoid engine battery depletion, it is common practice to use an isolator means, which may consist of a solid state isolator or a system of electrical relays, etc., to electrically isolate the engine battery from the auxiliary battery and the auxiliary battery's load, and to prevent electric current either from the engine battery or from the auxiliary battery from flowing to the vehicle's engine generator means. A typical prior art electrical system of such a vehicle is shown in the diagram of FIG. 1 with the auxiliary battery identified by the letter A; with the engine battery identified by the letter E; with the engine generator means, isolator means, independently powered generator means, AC/DC convertor means, electric utility source, auxiliary battery load and engine battery load identified by blocks or boxes; and with a switching means identified by the letter S providing automatic selection between the independently powered generator means and the electrical utility source.

With respect to their electrical needs, such vehicles (i.e., motor home recreational vehicles, pleasure boats, and similar vehicles referred to herein as "the vehicle" or the like) commonly have five primary modes of operation:

(a) underway with the vehicle engine operating and the independently powered electric generator means either stopped or unavailable, (b) underway with the vehicle engine operating and the independently powered electric generator means operating, (c) at rest or under sail with the vehicle engine stopped, and the independently powered electric generator means either stopped or unavailable and no connection to an electric utility service, (d) parked, berthed or anchored with the vehicle engine stopped and the independently powered electrical generator means operating, or (e) parked, berthed or anchored with the vehicle engine stopped and a connection between the vehicle and an electrical utility service.

With the vehicle engine operating, i.e., in modes (a) or (b), the electric generator driven by the vehicle engine is commonly used to provide direct electric current to supply both the engine battery load and the auxiliary battery load, and to charge both the engine battery and the auxiliary battery.

When a connection has been established between the vehicle and electric utility service, i.e., in mode (e), the vehicle may be said to be utility powered and will be s defined in the following disclosure. An AC/DC convertor means is commonly used while the vehicle is utility powered to convert utility electric service to suitable direct electric current to supply the auxiliary battery load, and to recharge the auxiliary battery.

When an independently powered electric generator is in operation, i.e., in modes (b) or (d), the vehicle may be said to be generator powered and will so defined in the following disclosure. While the vehicle is generator powered, the generator means may provide direct current to supply the auxiliary battery load, and to recharge the auxiliary battery. Alternatively, the generator means may provide alternating current to power the same convertor means as is used when the vehicle is utility powered and thus supply the auxiliary battery load and recharge the auxiliary battery. Such generator means often provides both direct current and alternating current simultaneously, but this does not alter their function with respect to supplying the auxiliary battery load and recharging the auxiliary battery.

When the vehicle engine is stopped, electrical utility service is unavailable, and an independently powered electric generator means is stopped or unavailable, i.e., in mode (c), the vehicle may be said to be battery powered, commonly by means of rechargeable storage batteries, and will be so defined in the following disclosure. Under this condition, and any other condition in which only direct current electric power is available, a device known as an invertor may be used to convert direct current to alternating current, but this does not constitute an additional operating mode, simply a variation on modes (a) and (c) and possibly (b) and (d), depending on the type of independently powered generator available. When battery powered, the only sources of electrical energy are the engine battery and the auxiliary battery. To assure sufficient electric energy to restart the vehicle engine, it is essential that the engine battery not be depleted during battery powered operation and it is common practice to incorporate an isolator means in the electrical system to, inter alia, electrically isolate the engine battery from the auxiliary battery and the auxiliary battery load.

Both when utility powered and generator powered, the isolator means prevents either the electric utility service or the independently powered generator means from recharging the engine battery and from supplying the engine battery load. Thus, the engine battery charge may become too depleted over time to start the vehicle's engine because it is not receiving a charging current and also because it continues to supply any engine battery load.

To avoid engine battery depletion when the vehicle is idle for an extended period of time, owners commonly run the vehicle engine periodically for short periods of time to keep the engine battery charged. This practice requires owner attention, increases fuel costs, and may shorten the vehicle engine's life. Alternatively, owners may periodically or continuously connect a battery charger to the engine battery to restore or maintain its charge. Unless the battery charger is specifically designed for continuous charging, this practice could result in battery overcharge and failure. Convertors of the type described previously are commonly designed to be continually connected to rechargeable batteries and are not likely to overcharge them.

A preliminary patentability search conducted in class 307, subclasses 10.7 and 16, and class 320, subclass 15 produced the following patents:

Gebhard U.S. Pat. No. 2,866,907, issued Dec. 30, 1958, discloses the use of a "reserve" battery whose function is to provide backup power to the engine starting battery. In this patent, the only source of energy for charging the reserve battery is the engine generator. It provides for the reserve battery to be charged only during the interval between the time the engine starts and the time the engine reaches operating temperature. Neither the engine starting battery nor the reserve battery is charged when the vehicle is idle. In this patent, the reserve battery is cut in or out of the charging circuit by use of : (a) a vacuum operated switch mounted on the intake manifold, (b) a thermostatically operated switch mounted on the exhaust system, and (c) a manually operated switch. The manually operated switch is described as being of the type which will bridge the contacts from the two batteries when it is operated. When the contacts are so bridged, the two batteries are connected directly together and current may flow freely from the engine starting battery to the reserve battery.

Follmer U.S. Pat. No. 4,044,293, issued Aug. 23, 1977, describes the use of a "second starting battery" whose purpose is to provide, in conjunction with the normal engine starting battery, twice the normal voltage to the engine's starter. In this patent, the only source of energy for charging the second starting battery is the engine generator. In this patent, the second starting battery is always used when the vehicle is started, not just when extra power is needed.

Ghibaudo et al. U.S. Pat. No. 4,264,855, issued Apr. 28, 1981, describes an electrical system for recreational vehicles having one main or engine battery, one auxiliary battery, one engine generator, a main or engine battery load, an auxiliary battery load, and a supply device or convertor to supply power when the engine is stopped. Three operating stages are disclosed: vehicle running, vehicle stopped and convertor in operation, and vehicle stopped and convertor not in operation. While the vehicle is running, both engine battery and auxiliary battery loads are directly connected to each other and to the engine generator. The engine generator is also connected to one of the two batteries, the choice being made by the vehicle operator via a manual switch. Two ammeters are described to assist the operator in making this choice. While the vehicle is stopped and the convertor is connected, the two loads and both batteries are powered by the convertor. While the vehicle is stopped and the convertor is not connected, the engine generator load is connected either to the engine battery or the auxiliary battery (depending on the switch position selected by the operator), and the auxiliary battery load is connected only to the auxiliary battery.

Iwaki et al. U.S. Pat. No. 4,564,799, issued Jan. 14, 1986, provides a second battery whose sole purpose is to power the vehicle's ignition system. Since this second battery is independent of the engine battery, its output voltage does not drop when the engine is being started. The claimed purpose of this invention is improving the operation of the ignition system during engine starts particularly when the engine battery is not fully charged and during cold weather, either of which conditions result in lower-than-normal engine battery voltage. This patent does not provide means for maintaining a charge in the engine battery during periods when the vehicle is idle. This patent describes several means for charging the second battery: solar cell, thermoelectric transducer, thermionic generator, or a piezoelectric transducer.

Farber et al. U.S. Pat. No. 4,757,249, issued Jul. 12, 1988, describes a dual battery and dual engine generator system wherein each battery is charged only by its associated engine generator. To provide extra power to the engine starter, both batteries are always connected in parallel when starting the engine. Otherwise, each battery powers its own load, and shares in supplying "critical loads." Enhanced capability for engine starting is provided by redundancy in both generators and batteries.

Nothing in the above patents or prior art discloses or suggests the present invention. More specifically, nothing in the above patents or prior art discloses or suggests an improved vehicle electrical system for use in a vehicle having an engine and including a rechargeable engine battery, an engine battery load, a rechargeable auxiliary battery, an auxiliary battery load, an engine generator means powered by the engine for generating electric current, and a supplemental electric current source capable of providing electric current to the auxiliary battery and to the auxiliary battery load, wherein the improvement comprises link circuit means for electrically linking the engine battery, the auxiliary battery, and the supplemental electric current source; and control means for allowing electric current to flow through the link circuit means from the auxiliary battery and/or the supplemental electric current source to the engine battery and the engine battery load without allowing the flow of significant electric current from the engine battery to the auxiliary battery or the auxiliary battery load.

SUMMARY OF THE INVENTION

The present invention provides an improved vehicle electrical system specifically designed to provide charging current to the engine battery whenever the vehicle is powered by a supplemental electric current source such as, e.g., an on-board generator means or utility electric power. The concept of the present invention is to provide means for connecting the engine battery, the auxiliary battery, and the supplemental electric current source, and for permitting controlled current flow to the engine battery from the supplemental electric current source.

The improved vehicle electrical system of the present invention is for use in a vehicle having an engine and including a rechargeable engine battery, an engine battery load, a rechargeable auxiliary battery, an auxiliary battery load, an engine generator means powered by the engine for generating electric current, and a supplemental electric current source capable of providing electric current to the auxiliary battery and to the auxiliary battery load. The improvement of the present invention includes link circuit means for electrically linking the engine battery, the auxiliary battery, and the supplemental electric current source; and control means for allowing electric current to flow through the link circuit means from the auxiliary battery and/or the supplemental electric current source to the engine battery and the engine battery load without allowing the flow of significant electric current from the engine battery to the auxiliary battery or the auxiliary battery load.

A primary object of the present invention is to provide an enhanced vehicle electrical system which overcomes an important deficiency of commonly used electrical systems for recreation vehicles and the like of preventing the engine battery charge from being maintained while generator or utility powered, by supplying direct electric current to the engine battery to prevent it from becoming discharged, both while generator powered and while utility powered.

Another object of the present invention is to prevent the engine battery of motor homes and the like from becoming too depleted to start the engine after the vehicle has been at rest for an extended period by providing a means to provide charging current to the engine battery whenever the vehicle is powered by an independently powered generator means or by connection to utility electric power.

Another object of the present invention is to provide an additional circuit link for connection between the engine battery and the auxiliary battery to permit controlled current flow to the engine battery, but not from the engine battery.

Since the life of commonly used rechargeable batteries is shortened by repeated discharge/charging cycles, and since the engine battery is depended upon to start the vehicle engine, another object of the present invention is to provide means to continuously maintain the engine battery in a charged state without risk of overcharging and without attention from the vehicle owner or operator.

Another object of the present invention is to provide an enhanced vehicle electrical system which allows the auxiliary battery to supplement the engine battery while battery powered to reduce the risk of the engine battery becoming too depleted to start the vehicle engine.

Another object of the present invention is to provide such enhanced features while retaining al essential features of the commonly used vehicle electrical system.

BRIEF DESCRIPTION OF THE DRAWINGS

FIG. 1 is a diagram of a typical prior art electrical system of a vehicle having a first or engine storage battery and a second or auxiliary storage battery.

FIG. 2 is a diagram of the improved vehicle electrical system of the present invention.

DESCRIPTION OF THE PREFERRED EMBODIMENTS

Figure 3:
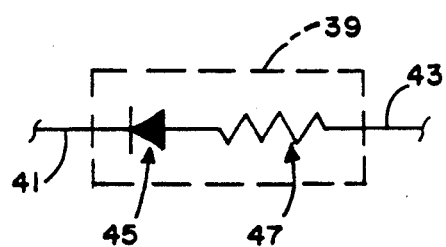
FIG. 3 is a schematic diagram of a first embodiment of the circuit link means of the improved vehicle electrical system of the present invention.

The improved vehicle electrical system of the present invention is shown diagrammatically in FIG. 2 and is identified by the numeral 11. The improved vehicle electrical system 11 is for use in combination with a vehicle 13 such as a motor home recreational vehicle, pleasure boat, and the like shown diagrammatically in FIG. 2. Such a vehicle 13 commonly employs two rechargeable batteries or groups of batteries. One battery or group of batteries is used for starting the engine, powering the vehicle's running lights, instruments, radio, horn, etc. The other battery or group of batteries is used for interior lights and for other general purposes when the vehicle is battery powered. During this disclosure, the former will be referred to as the "engine battery" and the latter will be referred to as the "auxiliary battery." Thus, as shown in FIG. 2, the vehicle 13 has a vehicle engine or motor 15 such as a typical internal combustion gasoline engine or the like, a rechargeable, direct current first or engine battery 17 for providing direct electric current to an engine battery load 19 such as the starter for the vehicle engine 15, horns, running lights, etc.(i.e., the devices dependent on the engine battery 17 are referred to in this disclosure as the engine battery load 19,) a rechargeable, direct current second or auxiliary battery 21 for providing direct electric current to an auxiliary battery load 23 such as certain auxiliary components of the vehicle including the interior lights, etc. (i.e., the devices dependent on the auxiliary battery 21 are referred to in this disclosure as the auxiliary battery load 23). It should be understood that each battery 17, 21 may be embodied by one battery or by two or more batteries electrically interconnected to perform the function of a single battery. The engine battery 17 and the auxiliary battery 21 have the same nominal voltage rating and are commonly, but not necessarily of the same type, e.g., lead acid. The vehicle 13 also includes an engine generator means 25 powered by the vehicle engine by way of belts, shafts, or the like for generating direct current electrical energy as will now be apparent to those skilled in the art for providing direct electric current to the engine battery 17 and the auxiliary battery 21 when the vehicle engine 15 is running, i.e., for recharging the engine battery 17 and the auxiliary battery 21 when the vehicle engine 15 is running as will now be apparent to those skilled in the art. The engine generator means 25 may consist of any typical generator or alternator of any construction and operation well known to those skilled in the art. The vehicle 13 also includes a supplemental electric current source capable of providing electric current to the auxiliary battery 21 and the auxiliary battery load 23 when the vehicle engine 15 is not running, i.e., for recharging the auxiliary battery 21 and powering the auxiliary battery load 23 when the vehicle engine 15 is not running as will now be apparent to those skilled in the art. The supplemental electric current source preferably includes an independently powered generator means 27 of any construction and operation well known to those skilled in the art. The supplemental electric current source preferably includes an alternating electric current to direct electric current (AC/DC) convertor means 29 for being connected to an electric utility alternating current source 31 (e.g., a typical 110 volt duplex outlet, a 30 amp. or 50 amp. single, non-duplex outlet, or the like) of any construction and operation well known to those skilled in the art. The supplemental electric current source preferably includes a switching means 33 for providing automatic selection between the independently powered generator means 27 and the AC/DC convertor means 29 as will now be apparent to those skilled in the art. To help avoid depletion of the engine battery 17, it is common practice to include an isolator means 35 for electrically isolating the engine battery 17 from the auxiliary battery 21 and the auxiliary battery load 23, and for preventing electric current either from the engine battery 17 or from the auxiliary battery 21 from flowing to the engine generator means 25. Such an isolator means 35 typically consists of a solid state electronic device or a system of electrical relays of various specific constructions and operations as will now be apparent to those skilled in the art.

The preferred embodiment of the improvement of the present invention consists, in general, of an electric link or connection between the ungrounded terminal of the engine battery 17 and the ungrounded terminal of the auxiliary battery 21. More specifically, the improvement of the present invention includes link circuit means 37 for electrically linking the engine battery 17, the auxiliary battery 21, and the supplemental electric current source, and control means 39 for allowing electric current to flow through the link circuit means 37 from the auxiliary battery 21 and/or the supplemental electric current source to the engine battery 17 and the engine battery load 19 without allowing the flow of significant electric current from the engine battery 17 to the auxiliary battery 21 or the auxiliary battery load 23.

The link circuit means 37 may include a first electric conductor 41 extending between the engine battery 17 and the control means 39, and a second electric conductor 43 extending between the auxiliary battery 21 and the control means 39 as clearly shown in FIG. 2.

The control means 39 preferably allows electric current to flow through the link circuit means 37 from the auxiliary battery 21 and/or the supplemental electric current source to the engine battery 17 and the engine battery load 19 only if the electric potential differences across the auxiliary battery 21 (i.e., across the terminals of the auxiliary battery 21) and/or across the supplemental electric current source exceeds, by a small predetermined minimum value, the electric potential difference across the engine battery 17 (i.e., across the terminals of the engine battery 17). The control means 39 preferably allows electric current up to a predetermined maximum value to flow through the link circuit means 37 from the auxiliary battery 21 and/or the supplemental electric current source to the engine battery 17 and the engine battery load 19. The control means 39 preferably includes relay means for allowing electric current to flow through the link circuit means 37 from the auxiliary battery 21 and/or the supplemental electric current source to the engine battery 17 and the engine battery load 19 if, and only if, the engine 15 is stopped and the supplemental electric current source is coupled to the auxiliary battery 21.

A first embodiment of the control means 39 is shown schematically in FIG. 3 and includes a semiconductor diode means 45 and a current limiting resistor means 47 in series with the semiconductor diode means 45 for allowing electric current to flow through the link circuit means 37 from the auxiliary battery 21 and/or the supplemental electric current source to the engine battery 17 and the engine battery load 19 if, and only if, the electric potential difference across the auxiliary battery 21 and/or across the supplemental electric current source exceeds the electrical cutin potential of the diode means 45 added to the electric potential difference across the engine battery 17 as will now be apparent to those skilled in the art.

Figure 4:
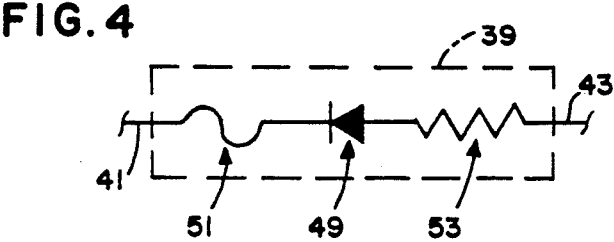
FIG. 4 is a schematic diagram of a second embodiment of the circuit link means of the improved vehicle electrical system of the present invention.

A second embodiment of the control means 39 is shown schematically in FIG. 4 and includes a semiconductor diode means 49 for allowing electric current to flow through the link circuit means 37 from the auxiliary battery 21 and/or the supplemental electric current source to the engine battery 17 and the engine battery load 19 if, and only if, the electric potential difference across the supplemental electric current source exceeds the electrical cutin potential of the diode means 49 added to the electric potential difference across the engine battery 17. The second embodiment of the control means 39 also preferably includes a current limiting fuse means 51, circuit breaker or similar device in series with the semiconductor diode means 49 for allowing electric current to flow through the link circuit means 37 from the auxiliary battery 21 and/or the supplemental electric current source to the engine battery 17 and the engine battery load 19 if, and only if, the electric potential difference across the auxiliary battery 21 and/or across the supplemental electric current source exceeds the electrical cutin potential of the diode means 49 added to the electric potential difference across the engine battery 17. The second embodiment of the control means 39 also preferably includes a current limiting resistor means 53 in series with the semiconductor diode means 49 and with the current limiting fuse means 51, if present, in series with the current limiting resistor means 53 for allowing electric current to flow through the link circuit means 37 from the auxiliary battery 21 and/or the supplemental electric current source to the engine battery 17 and the engine battery load 19 if, and only if, the electric potential difference across the auxiliary battery 21 and/or across the supplemental electric current source exceeds the electrical cutin potential of the diode means 49 added to the electric potential difference across the engine battery 17 as will now be apparent to those skilled in the art.

Figure 5:
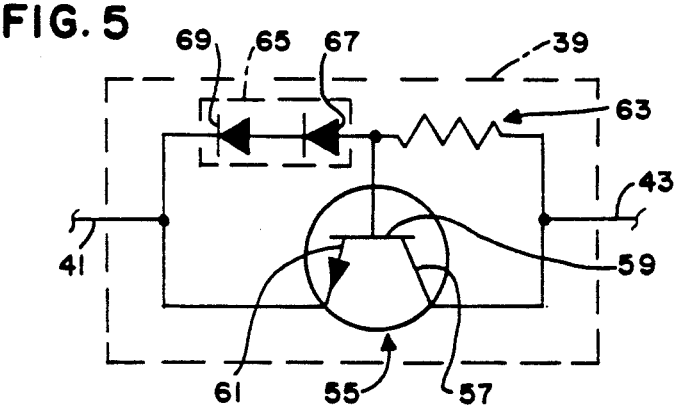
FIG. 5 is a schematic diagram of a third embodiment of the circuit link means of the improved vehicle electrical system of the present invention.

A third embodiment of the control means 39 is shown schematically in FIG. 5. In this embodiment, the negative terminal of the engine battery 17 is connected to ground and the negative terminal of the auxiliary battery 21 is connected to ground as shown in FIG. 2. The third embodiment of the control means 39 includes a bipolar NPN transistor means 55 having a collector terminal 57 for being connected to the positive terminal of the auxiliary battery 21, having a base terminal 59, and having an emitter terminal 61 for being connected to the positive terminal of the engine battery 17; includes a resistor means 63 for being connected between the collector terminal 57 of the transistor means 55 and the base terminal 59 of the transistor means 55; and includes diode means 65 having anode means 67 for being connected to the base terminal 59 of the transistor means 55 and having cathode mean 69 for being connected to the emitter terminal 61 of the transistor means 55 for allowing electric current to flow through the link circuit means 37 from the auxiliary battery 21 and/or the supplemental electric current source to the engine battery 17 and the engine battery load 19 if, and only if, the electric potential difference across the auxiliary battery 21 and/or across the supplemental electric current source exceeds the electrical potential across the engine battery 17 by an amount sufficient to cause enough current to flow through resistor means 63 to base terminal 59 to result in current flow from collector terminal 57 to emitter terminal 61 of transistor means 55. If the positive, rather than the negative terminals of the auxiliary battery 21 and the engine battery 17 are grounded, the collector terminal 57 of the transistor means 55 should be connected to the engine battery 17, and the emitter terminal 61 of the transistor means 55 should be connected to the auxiliary battery 21 with the other elements remaining the same. A PNP transistor may be used in lieu of the NPN transistor means 55 by connecting the emitter terminal of the PNP transistor to the auxiliary battery 21, connecting the collector terminal of the PNP transistor to the engine battery 17, by connecting the anode terminal 67 of diode means 65 to the emitter of the PNP transistor means, connecting the cathode terminal 69 of diode means 65 to the base of the PNP transistor, and connecting resistor means 63 between the base of the PNP transistor mean and the collector terminal of the PNP transistor means. Further, a field effect transistor can be used in lieu of the transistor means 55 provided that n-channel types are used in lieu of NPN transistors, p-channel types are used in lieu of PNP transistors, drain terminals are used in lieu of collector terminals, source terminals are used in lieu of emitter terminals, and gate terminals are used in lieu of base terminals.

Figure 6:
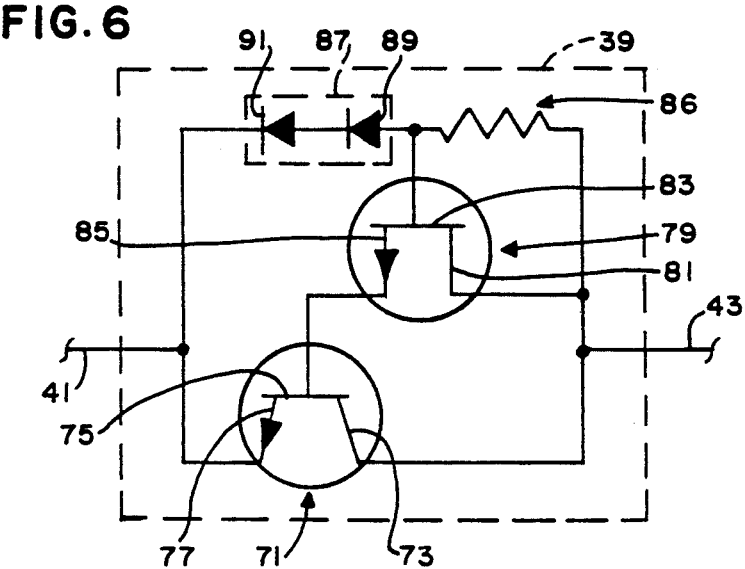
FIG. 6 is a schematic diagram of a fourth embodiment of the circuit link means of the improved vehicle electrical system of the present invention.

A fourth embodiment of the control means 39 is shown schematically in FIG. 6. In this embodiment, the negative terminal of the engine battery 17 is connected to ground and the negative terminal of the auxiliary battery 21 is connected to ground as shown in FIG. 2. The fourth embodiment of the control means 39 includes a bipolar NPN transistor means 71 having a collector terminal 73 for being connected to the positive terminal of the auxiliary battery 21, having a base terminal 75, and having an emitter terminal 77 for being connected to the positive terminal of the engine battery 17; includes a depletion mode field effect n-channel transistor means 79 having a drain terminal 81 for being connected to the collector terminal 73 of the transistor means 71, having a gate terminal 83, and having a source terminal 85 for being connected to the base terminal 75 of the transistor means 71; includes resistor means 86 for being connected between the drain terminal 81 and the gate terminal 83 of the transistor means 79; includes diode means 87 having anode means 89 for being connected to the gate terminal 83 of the field effect transistor means 79 and having cathode means 91 for being connected to the emitter terminal 77 of the transistor means 71 for allowing electric current to flow through the link circuit means 37 from the auxiliary battery 21 and/or the supplemental electric current source to the engine battery 17 and the engine battery load 19 if, and only if, the electric potential difference across the auxiliary battery 21 and/or across the supplemental electric current source exceeds the electrical potential across the engine battery 17 by an amount sufficient to cause enough current to flow from collector terminal 81 to source terminal 85 of transistor means 79 to base terminal 75 of transistor means 71 to result in current flow between the collector terminal 73 of the transistor means 71 and the emitter terminal 77 of the transistor means 71. If the positive, rather than the negative terminals of the auxiliary battery 21 and the engine battery 17 are grounded, the collector terminal 73 of the transistor means 71 should be connected to the engine battery 17, and the emitter terminal 77 of the transistor means 71 should be connected to the auxiliary battery 21 with the other elements remaining the same. A PNP transistor may be used in lieu of the NPN transistor means 71 by connecting the emitter terminal of the PNP transistor to the auxiliary battery 21, connecting the collector terminal of the PNP transistor to the engine battery 17, by replacing the n-channel field effect transistor means 79 with a p-channel field effect transistor means, by connecting the drain terminal of the p-channel transistor means to the collector terminal of the PNP transistor means, by connecting the source terminal of the p-channel field effect transistor means to the base terminal of the PNP transistor means, by connecting the anode terminal 89 of diode means 87 to the emitter terminal of the PNP transistor means, by connecting the cathode terminal 91 of diode means 87 to the gate terminal of the p-channel field effect transistor means 79, and by connecting resistor means 86 between the collector terminal of the PNP transistor means and the gate terminal of the p-channel field effect transistor means.

In the previous description of embodiments three and four illustrated by FIG. 5 (FIG. 6), resistor means 63 (86) and diode means 65 (87), are used in conjunction with transistor means 55 (79, 71), to determine the relationship between the electric potential difference between terminals 57, 61 (73, 77), and the current flowing between these terminals, thus providing the necessary control means 39 by determining the voltage/current characteristics of link 37. By increasing the value of resistor means 63 (86), the current through link 37 may be reduced for a given electric potential difference between auxiliary battery 21 and engine battery 17. By varying the number and type of diodes comprising diode means 65 (87), in conjunction with changing the value of resistor means 63 (86), the relationship between the current through link 37 and the electric potential difference between the auxiliary battery 21 and the engine battery 17, i.e., the electric potential difference across the link 37, may be controlled over a broad range thereby providing the necessary control means 39.

The use and operation of the present invention is quite simple. The link circuit means 37 and control means 39 may be incorporated in the electrical system 11 as a separate device added to existing vehicles, may be incorporated as an integral part of a new vehicle electric system during original manufacture, or may be incorporated in another component (e.g., the isolator means 35) in the form of an enhanced solid state isolator which in turn may be either incorporated as a integral part of a new vehicle electric system during original manufacture or used to replace the original component in an existing vehicle, etc. Once the vehicle electrical system 11 has been enhanced by installing the link circuit means 37 and the control means 39, the present invention will prevent significant direct electric current flow through the link circuit means 37 from the engine battery 17 to the auxiliary battery 21 under any and all operating conditions, while allowing the flow of electric current through the link circuit means 37 from the auxiliary battery 21 to the engine battery 17 while the vehicle 13 is generator powered or utility powered, and optionally, when battery powered. Thus, when the switching means 33 closes the circuit to the generator means 27, the present invention allows, while the vehicle 13 is parked, berthed or anchored with the vehicle engine 15 stopped and the independently powered electrical generator means 25 operating, the independently powered generator means 25, which is customarily connected to the ungrounded terminal of the auxiliary battery 21, to supply direct electric current through the new link or connection to the engine battery 17 while preventing significant electric current from flowing from the engine battery 17 through the link circuit mean 37 to the auxiliary battery 21 or the auxiliary battery load 23. Likewise, when the switching means 33 closes the circuit to the convertor means 29 and the utility source 31, the present invention allows, while the vehicle 13 is parked, berthed, or anchored with the vehicle engine 15 stopped and a connection between the vehicle 15 and the electrical utility service 31, the convertor means 29, which is customarily connected to the ungrounded terminal of the auxiliary battery 21, to supply direct electric current through the link circuit means 37 to the engine battery 17 while preventing significant electric current from flowing from the engine battery 17 through the new link or connection to the auxiliary battery 21 or the auxiliary battery load 23. Optionally, the present invention allows the auxiliary battery 21 to supply electric current through the link circuit means 37 to the engine battery 17 while preventing significant electric current from flowing from the engine battery 17 through the link circuit means 37 to the auxiliary battery 21 or the auxiliary battery load 23 when the vehicle 13 is at rest or under sail with the vehicle engine 15 stopped, and the generator means 27 either stopped or unavailable and n connection to the electric utility source 31 (i.e., when the vehicle 13 is battery powered).

The present invention also optionally provides an electrical offset potential which must be exceeded before significant electric current may flow through the link circuit means 37 to the engine battery 17. This feature prevents overload of either the link circuit means 37 and control means 39, the independently powered generator means 27 when the vehicle 13 is generator powered, or the convertor means 29 when the vehicle 13 is utility powered, by reducing the level of electric current from those sources to the engine battery load 19 as well as to the engine battery 17 itself, while still allowing sufficient charging current to flow from those sources to maintain the engine battery 19 in a near fully charged state. It should be noted that when the vehicle engine 15 is being started, the current drawn by the electric engine starter is quite high and can cause excessive current to flow through the link circuit means 37 and control means 39 from the independently powered generator means 27 or the convertor means 29 and could result in damage to the link circuit means 37, control means 39, independently powered generator means 27, and/or convertor means 29, and/or blown fuses or tripped circuit breakers. The offset also serves as an additional safeguard against overcharging the engine battery 17 while operating in these modes. A further advantage of this electrical offset potential is that it helps restrict the flow of excessive electric current through the link circuit means 37 and control means 39 from the auxiliary battery 21 to the engine battery 17 and the engine battery load 19 while the vehicle 13 is battery powered, and while still allowing sufficient charging current to flow from the auxiliary battery 21 to maintain the engine battery 17 in a charged state.

The present invention also optionally provides a means to limit the current flow through the link circuit mean 37 during conditions when the engine battery load 19 is high, for example, when starting the vehicle engine 15, or turning on the headlights of the vehicle 13 when the vehicle engine 15 is not running. Accidental short circuits and a dead or missing engine battery 17 could similarly result in excessive current through the link circuit means 37 unless means are provided to limit such current. Such limiting also avoids overload of either the independently powered generator means 27 or the convertor means 29 and avoids excessive temperature build up in the link circuit means 37 and control means 39. However, the control means 39 may be designed to provide adequate electric current to flow through the link circuit means 37 to supplement the electric current flow from the engine battery 17 and provide additional energy for the vehicle engine starter and for any other engine battery load 19. This current limiting may be provided by the use of a suitable fuse or circuit breaker, or it may be provided by the use of a suitable power transistor in combination with circuit elements arranged in such a way as to limit the current to a predetermined level, even in the extreme case of a zero resistance load.

Although the present invention has been described and illustrated with respect to a preferred embodiment and a preferred use therefor, it is not to be so limited since modifications and changes can be made therein which are within the full intended scope of the invention.

I claim:

1. An improved vehicle electrical system for use in a vehicle having an engine and including a rechargeable engine battery, an engine battery load, a rechargeable auxiliary battery, an auxiliary battery load, an engine generator means powered by said engine for generating an electric current, and a supplemental electric current source capable of providing electric current to said auxiliary battery and to the auxiliary battery load, wherein the improvement comprises:
   a) link circuit means for electrically linking said engine battery, said auxiliary battery, and said supplemental electric current source; and
   b) control means for allowing electric current to flow through said link circuit means from said auxiliary battery and/or said supplemental electric current source to said engine battery and said engine battery load without allowing the flow of significant electric current from said engine battery to said auxiliary battery or said auxiliary battery load.

2. The improvement of claim in which said supplemental electric current source includes an independently powered generator means.

3. The improvement of claim 1 in which said supplemental electric current source includes an alternating current to direct current convertor for being connected to an electric utility alternating current source.

4. The improvement of claim, 2 in which said supplemental electric current source includes an alternating current to direct current convertor for being connected to an electric utility alternating current source.

5. The improvement of claim 1 in which said electrical system includes isolator means for permitting electric current flow from said engine generator means to said engine battery and to said auxiliary battery while preventing electric current flow from either said engine battery or said auxiliary battery to said engine generator means and for electrically isolating said engine battery from said auxiliary battery and said auxiliary battery load; and in which said control means allows electric current to flow through said link circuit means from said auxiliary battery and/or said supplemental electric current source to said engine battery and said engine battery load only if the electric potential difference across said auxiliary battery terminals and/or across said supplemental electric current source exceeds, by a small predetermined minimum value, the electric potential difference across said engine battery terminals.

6. The improvement of claim 1 in which said electrical system includes isolator means for permitting electric current flow from said engine generator means to said engine battery and to said auxiliary battery while preventing electric current flow from either said engine battery or said auxiliary battery to said engine generator means and for electrically isolating said engine battery from said auxiliary battery and said auxiliary battery load; and in which said control means allows electric current up to a predetermined maximum value to flow through said link circuit means from said auxiliary battery and/or said supplemental electric current source to said engine battery and said engine battery load.

7. The improvement of claim 1 in which said electrical system includes isolator means for permitting electric current flow from said engine generator means to said engine battery and to said auxiliary battery while preventing electric current flow from either said engine battery or said auxiliary battery to said engine generator means and for electrically isolating said engine battery from said auxiliary battery and said auxiliary battery load; and in which said control means includes relay means for allowing electric current to flow through said link circuit means from said auxiliary battery and/or said supplemental electric current source to said engine battery and said engine battery load only if said engine is stopped and said supplemental electric current source is coupled to said auxiliary battery.

8. The improvement of claim 1 in which said electrical system includes isolator means for permitting electric current flow from said engine generator means to said engine battery and to said auxiliary battery while preventing electric current flow from either said engine battery or said auxiliary battery to said engine generator means and for electrically isolating said engine battery from said auxiliary battery and said auxiliary battery load; and in which said control means includes semiconductor diode means for allowing electric current to flow through said link circuit means from said auxiliary battery and/or said supplemental electric current source to said engine battery and said engine battery load only if the electric potential difference across said supplemental electric current source exceeds the electrical cutin potential of said diode means added to the electric potential difference across said engine battery.

9. The improvement of claim in which said electrical system includes isolator means for permitting electric current flow from said engine generator means to said engine battery and to said auxiliary battery while preventing electric current flow from either said engine battery or said auxiliary battery to said engine generator means and for electrically isolating said engine battery from said auxiliary battery and said auxiliary battery load; and in which said control means includes semiconductor diode means and current limiting fuse means in series with said semiconductor diode means for allowing electric current to flow through said link circuit means from said auxiliary battery and/or said supplemental electric current source to said engine battery and said engine battery load only if the electric potential difference across said auxiliary battery and/or across said supplemental electric current source exceeds the electrical cutin potential of said diode means added to the electric potential difference across said engine battery.

10. The improvement of claim 1 in which said electrical system includes isolator means for permitting electric current flow from said engine generator means to said engine battery and to said auxiliary battery while preventing electric current flow from either said engine battery or said auxiliary battery to said engine generator means and for electrically isolating said engine battery from said auxiliary battery and said auxiliary battery load; and in which said control means includes semiconductor diode means and current limiting resistor means in series with said semiconductor diode means for allowing electric current to flow through said link circuit means from said auxiliary battery and/or said supplemental electric current source to said engine battery and said engine battery load only if the electric potential difference across said auxiliary battery and/or across said supplemental electric current source exceeds the electrical cutin potential of said diode means added to the electric potential difference across said engine battery.

11. The improvement of claim 1 in which said electrical system includes isolator means for permitting electric current flow from said engine generator means to said engine battery and to said auxiliary battery while preventing electric current flow from either said engine battery or said auxiliary battery to said engine generator means and for electrically isolating said engine battery from said auxiliary battery and said auxiliary battery load; and in which said control means includes a current limiting resistor means, a semiconductor diode means, and a current limiting fuse means in series with said current limiting resistor means for allowing electric current to flow through said link circuit means from said auxiliary battery and/or said supplemental electric current source to said engine battery and said engine battery load only if the electric potential difference across said auxiliary battery and/or across said supplemental electric current source exceeds the electrical cutin potential of said diode means added to the electric potential difference across said engine battery.

12. The improvement of claim 1 in which said electrical system includes isolator means for permitting electric current flow from said engine generator means to said engine battery and to said auxiliary battery while preventing electric current flow from either said engine battery or said auxiliary battery to said engine generator means and for electrically isolating said engine battery from said auxiliary battery and said auxiliary battery load; and in which said engine battery has a negative terminal connected to ground and has a positive terminal; in which said auxiliary battery has a negative terminal connected to ground and has a positive terminal; in which said control means includes a bipolar NPN transistor means having a collector terminal for being connected to said positive terminal of said auxiliary battery, having a base terminal, and having an emitter terminal for being connected to said positive terminal of said engine battery; in which said control means includes a resistor means for being connected between said collector terminal of said transistor means and said base terminal of said transistor means; and in which said control means includes diode means having anode means for being connected to said base terminal of said transistor means and having cathode means for being connected to said emitter terminal of said transistor means for allowing electric current to flow through said link circuit means from said auxiliary battery and/or said supplemental electric current source to said engine battery and said engine battery load only if the electric potential difference across said auxiliary battery and/or across said supplemental electric current source exceeds the electrical potential across said engine battery by an amount sufficient to cause base current to flow sufficiently to result in current flow between said collector terminal of said transistor means and said emitter terminal of said transistor means.

13. The improvement of claim 1 in which said electrical system includes isolator means for permitting electric current flow from said engine generator means to said engine battery and to said auxiliary battery while preventing electric current flow from either said engine battery or said auxiliary battery to said engine generator means and for electrically isolating said engine battery from said auxiliary battery and said auxiliary battery load; and in which said engine battery has a negative terminal connected to ground and has a positive terminal; in which said auxiliary battery has a negative terminal connected to ground and has a positive terminal; in which said control means includes a bipolar NPN transistor means having a collector terminal for being connected to said positive terminal of said auxiliary battery, having a base terminal, and having an emitter terminal for being connected to said positive terminal of said engine battery; in which said control means includes a depletion mode field effect n-channel transistor means having a drain terminal for being connected to said collector terminal of said bipolar transistor means, having a gate terminal, and having a source terminal connected to said base terminal of said bipolar transistor means; in which said control means includes diode means having anode means for being connected to said gate terminal of said field effect transistor means and having cathode means for being connected to said emitter terminal of said bipolar transistor means for allowing electric current to flow through said link circuit means from said auxiliary battery and/or said supplemental electric current source to said engine battery and said engine battery load only if the electric potential difference across said auxiliary battery and/or across said supplemental electric current source exceeds the electrical potential across said engine battery by an amount sufficient to cause base current to flow sufficiently to result in current flow between said collector terminal of said bipolar transistor means and said emitter terminal of said bipolar transistor means.

14. An improved vehicle electrical system for use in a vehicle having an engine and including a rechargeable engine battery, an engine battery load, a rechargeable auxiliary battery, an auxiliary battery load, an engine generator means powered by said engine for generating direct electric current, isolator means for permitting direct electric current flow from said engine generator means to said engine battery and to said auxiliary battery while preventing direct electric current flow from either said engine battery or said auxiliary battery to said engine generator means and for electrically isolating said engine battery from said auxiliary battery and said auxiliary battery load, and a supplemental direct electric current source including an independently powered generator means capable of providing direct electric current to said auxiliary battery and to the auxiliary battery load, wherein the improvement comprises:
  a) link circuit means for electrically linking said engine battery, said auxiliary battery, and said supplemental electric current source; and
  b) control means for allowing direct electric current to flow through said link circuit means from said auxiliary battery and/or said supplemental direct electric current source to said engine battery and said engine battery load without allowing the flow of significant direct electric current from said engine battery to said auxiliary battery or said auxiliary battery load.

15. The improvement of claim 14 in which said control means allows direct electric current to flow through said link circuit means from said auxiliary battery and/or said supplemental direct electric current source to said engine battery and said engine battery load only if the electric potential differences across said auxiliary battery terminals and/or across said supplemental direct electric current source exceeds, by a small predetermined minimum value, the electric potential difference across said engine battery terminals.

16. The improvement of claim 14 in which said control means allows direct electric current up to a predetermined maximum value to flow through said link circuit means from said auxiliary battery and/or said supplemental direct electric current source to said engine battery and said engine battery load.

17. The improvement of claim 14 in which said control means includes relay means for allowing direct electric current to flow through said link circuit means from said auxiliary battery and/or said supplemental direct electric current source to said engine battery and said engine battery load only if said engine is stopped an said supplemental direct electric current source is coupled to said auxiliary battery.

18. The improvement of claim 14 in which said control means includes semiconductor diode means for allowing direct electric current to flow through said link circuit means from said auxiliary battery and/or said supplemental direct electric current source to said engine battery and said engine battery load only if the electric potential difference across said supplemental direct electric current source exceeds the electrical cutin potential of said diode means added to the electric potential difference across said engine battery.

19. The improvement of claim 14 in which said control means includes semiconductor diode means and current limiting fuse means in series with said semiconductor diode means for allowing direct electric current to flow through said link circuit means from said auxiliary battery and/or said supplemental direct electric current source to said engine battery and said engine battery load only if the electric potential difference across said auxiliary battery and/or across said supplemental direct electric current source exceeds the electrical cutin potential of said diode means added to the electric potential difference across said engine battery.

20. The improvement of claim 14 in which said control means includes semiconductor diode means and current limiting resistor means in series with said semiconductor diode means for allowing direct electric current to flow through said link circuit means from said auxiliary battery and/or said supplemental direct electric current source to said engine battery and said engine battery load only if the electric potential difference across said auxiliary battery and/or across said supplemental direct electric current source exceeds the electrical cutin potential of said diode means added to the electric potential difference across said engine battery.

21. The improvement of claim 14 in which said control means includes a current limiting resistor means, a semiconductor diode means, and a current limiting fuse means in series with said current limiting resistor means for allowing direct electric current to flow through said link circuit means from said auxiliary battery and/or said supplemental direct electric current source to said engine battery and said engine battery load only if the electric potential difference across said auxiliary battery and/or across said supplemental direct electric current source exceeds the electrical cutin potential of said diode means added to the electric potential difference across said engine battery.

22. The improvement of claim 14 in which said engine battery has a negative terminal connected to ground and has a positive terminal; in which said auxiliary battery has a negative terminal connected to ground and has a positive terminal; in which said control means includes a bipolar NPN transistor means having a collector terminal for being connected to said positive terminal of said auxiliary battery, having a base terminal, and having an emitter terminal for being connected to said positive terminal of said engine battery; in which said control means includes a resistor means for being connected between said collector terminal of said transistor means and said base terminal of said transistor means; and in which said control means includes diode means having anode means for being connected to said base terminal of said transistor means and having cathode means for being connected to said emitter terminal of said transistor means for allowing direct electric current to flow through said link circuit means from said auxiliary battery and/or said supplemental direct electric current source to said engine battery and said engine battery load only if the electric potential difference across said auxiliary battery and/or across said supplemental direct electric current source exceeds the electrical potential across said engine battery by an amount sufficient to cause base current to flow sufficiently to result in current flow between said collector terminal of said transistor means and said emitter terminal of said transistor means.

23. The improvement of claim 14 in which said engine battery has a negative terminal connected to ground and has a positive terminal; in which said auxiliary battery has a negative terminal connected to ground and has a positive terminal; in which said control means includes a bipolar NPN transistor means having a collector terminal for being connected to said positive terminal of said auxiliary battery, having a base terminal, and having an emitter terminal for being connected to said positive terminal of said engine battery; in which said control means includes a depletion mode field effect n-channel transistor means having a drain terminal for being connected to said collector terminal of said bipolar transistor means, having a gate terminal, and having a source terminal connected to said base terminal of said bipolar transistor means; in which said control means includes diode means having anode means for being connected to said gate terminal of said field effect transistor means and having cathode means for being connected to said emitter terminal of said bipolar transistor means for allowing direct electric current to flow through said link circuit means from said auxiliary battery and/or said supplemental direct electric current source to said engine battery and said engine battery load only if the electric potential difference across said auxiliary battery and/or across said supplemental direct electric current source exceeds the electrical potential across said engine battery by an amount sufficient to cause base current to flow sufficiently to result in current flow between said collector terminal of said bipolar transistor means and said emitter terminal of said bipolar transistor means.

24. An improved vehicle electrical system for use in a vehicle having an engine and including a rechargeable engine battery, an engine battery load, a rechargeable auxiliary battery, an auxiliary battery load, an engine generator means powered by said engine for generating direct electric current, isolator means for permitting direct electric current flow from said engine generator means to said engine battery and to said auxiliary battery while preventing direct electric current flow from either said engine battery or said auxiliary battery to said engine generator means and for electrically isolating said engine battery from said auxiliary battery and said auxiliary battery load, and a supplemental direct electric current source including an alternating current to direct current convertor for being connected to an electric utility alternating current source capable of providing direct electric current to said auxiliary battery and to the auxiliary battery load, wherein the improvement comprises:
 a) link circuit means for electrically linking said engine battery, said auxiliary battery, and said supplemental electric current source; and
 b) control means for allowing direct electric current to flow through said link circuit means from said auxiliary battery and/or said supplemental direct electric current source to said engine battery and said engine battery load without allowing the flow of significant direct electric current from said engine battery to said auxiliary battery or said auxiliary battery load.

25. The improvement of claim 24 in which said control means allows direct electric current to flow through said link circuit means from said auxiliary battery and/or said supplemental direct electric current source to said engine battery and said engine battery load only if the electric potential differences across said auxiliary battery terminals and/or across said supplemental direct electric current source exceeds, by a small predetermined minimum value, the electric potential difference across said engine battery terminals.

26. The improvement of claim 24 in which said control means allows direct electric current up to a predetermined maximum value to flow through said link circuit means from said auxiliary battery and/or said supplemental direct electric current source to said engine battery and said engine battery load.

27. The improvement of claim 2 in which said control means includes relay means for allowing direct electric current to flow through said link circuit means from said auxiliary battery and/or said supplemental direct electric current source to said engine battery and said engine battery load only if said engine is stopped and said supplemental direct electric current source is coupled to said auxiliary battery.

28. The improvement of claim 24 in which said control means includes semiconductor diode means for allowing direct electric current to flow through said link circuit means from said auxiliary battery and/or said supplemental direct electric current source to said engine battery and said engine battery load only if the electric potential difference across said supplemental direct electric current source exceeds the electrical cutin potential of said diode means added to the electric potential difference across said engine battery.

29. The improvement of claim 24 in which said control means includes semiconductor diode means and current limiting fuse means in series with said semiconductor diode means for allowing direct electric current to flow through said link circuit means from said auxiliary battery and/or said supplemental direct electric current source to said engine battery and said engine battery load only if the electric potential difference across said auxiliary battery and/or across said supplemental direct electric current source exceeds the electrical cutin potential of said diode means added to the electric potential difference across said engine battery.

30. The improvement of claim 24 in which said control means includes semiconductor diode means and current limiting resistor means in series with said semiconductor diode means for allowing direct electric current to flow through said link circuit means from said auxiliary battery and/or said supplemental direct electric current source to said engine battery and said engine battery load only if the electric potential difference across said auxiliary battery and/or across said supplemental direct electric current source exceeds the electrical cutin potential of said diode means added to the electric potential difference across said engine battery.

31. The improvement of claim 24 in which said control means includes a current limiting resistor means, a semiconductor diode means, and a current limiting fuse means in series with said current limiting resistor means for allowing direct electric current to flow through said link circuit means from said auxiliary battery and/or said supplemental direct electric current source to said engine battery and said engine battery load only if the electric potential difference across said auxiliary battery and/or across said supplemental direct electric current source exceeds the electrical cutin potential of said diode means added to the electric potential difference across said engine battery.

32. The improvement of claim 24 in which said engine battery has a negative terminal connected to ground and has a positive terminal; in which said auxiliary battery has a negative terminal connected to ground and has a positive terminal; in which said control means includes a bipolar NPN transistor means having a collector terminal for being connected to said positive terminal of said auxiliary battery, having a base terminal, and having an emitter terminal for being connected to said positive terminal of said engine battery; in which said control means includes a resistor means for being connected between said collector terminal of said transistor means and said base terminal of said transistor means; and in which said control means includes diode means having anode means for being connected to said base terminal of said transistor means and having cathode means for being connected to said emitter terminal of said transistor means for allowing direct electric current to flow through said link circuit means from said auxiliary battery and/or said supplemental direct electric current source to said engine battery and said engine battery load only if the electric potential difference across said auxiliary battery and/or across said supplemental direct electric current source exceeds the electrical potential across said engine battery by an amount sufficient to cause base current to flow sufficiently to result in current flow between said collector terminal of said transistor means and said emitter terminal of said transistor means.

33. The improvement of claim 24 in which said engine battery has a negative terminal connected to ground and has a positive terminal; in which said auxiliary battery has a negative terminal connected to ground and has a positive terminal; in which said control means includes a bipolar NPN transistor means having a collector terminal for being connected to said positive terminal of said auxiliary battery, having a base terminal, and having an emitter terminal for being connected to said positive terminal of said engine battery; in which said control means includes a depletion mode field effect n-channel transistor means having a drain terminal for being connected to said collector terminal of said bipolar transistor means, having a gate terminal, and having a source terminal connected to said base terminal of said bipolar transistor means; in which said control means includes diode means having anode means for being connected to said gate terminal of said field effect transistor means and having cathode means for being connected to said emitter terminal of said bipolar transistor means for allowing direct electric current to flow through said link circuit means from said auxiliary battery and/or said supplemental direct electric current source to said engine battery and said engine battery load only if the electric potential difference across said auxiliary battery and/or across said supplemental direct electric current source exceeds the electrical potential across said engine battery by an amount sufficient to cause base current to flow sufficiently to result in current flow between said collector terminal of said bipolar transistor means and said emitter terminal of said bipolar transistor means.

* * * * *